United States Patent
Vance et al.

[11] Patent Number: 6,131,874
[45] Date of Patent: Oct. 17, 2000

[54] INFORMATION DISPLAY SYSTEM

[75] Inventors: Gordon Vance, Kinnesswood; Neil Hunter, Limekilns, both of United Kingdom

[73] Assignee: IMS Innovation Limited, United Kingdom

[21] Appl. No.: 09/268,366

[22] Filed: Mar. 15, 1999

[51] Int. Cl.[7] .................................................. F16M 13/00
[52] U.S. Cl. ........................ 248/550; 248/919; 248/923
[58] Field of Search ..................................... 248/550, 917, 248/918, 919, 922, 923, 371, 397, 176.1; D14/113, 114

[56] References Cited

U.S. PATENT DOCUMENTS

| | | | |
|---|---|---|---|
| D. 295,415 | 4/1988 | Thies et al. | D14/114 |
| D. 313,405 | 1/1991 | Barry et al. | D14/113 |
| D. 326,847 | 6/1992 | Savio | D14/113 |
| 4,905,543 | 3/1990 | Choi | 74/827 |
| 5,102,082 | 4/1992 | Bang . | |
| 5,587,876 | 12/1996 | O'Brien et al. . | |
| 5,715,138 | 2/1998 | Choi | 361/681 |
| 6,007,038 | 12/1999 | Han | 248/371 |
| 6,015,120 | 1/2000 | Sweere et al. | 248/123.11 |
| 6,061,104 | 5/2000 | Evanicky et al. | 348/827 |

FOREIGN PATENT DOCUMENTS

| | | |
|---|---|---|
| 2 206 464 | 1/1989 | United Kingdom . |
| 2 253 497 | 9/1992 | United Kingdom . |
| 2 306 837 | 5/1997 | United Kingdom . |
| 2 320 387 | 6/1998 | United Kingdom . |
| 2 331 651 | 5/1999 | United Kingdom . |

OTHER PUBLICATIONS

Patent Abstract, DE 4300725 A, Walter Holzer, Computer monitor with pivot mounting.
Patent Abstract, JP 3020774, Canon, Inc., Takashi Minagawa, Display Device.

*Primary Examiner*—Anita M. King
*Assistant Examiner*—Naschica C Sanders
*Attorney, Agent, or Firm*—Ratner & Prestia

[57] ABSTRACT

An information display system in which positional incompatibility with respect to a user of a display screen is overcome by means of making the screen pivotable to align with the user. Pivotal adjustment can be manual, or (in some embodiments) automatically performed by an in-built user-sensing camera. To protect the display system from children, the display is rendered inactive if the user's height is sensed as being below a pre-set minimum height.

2 Claims, 5 Drawing Sheets

INFORMATION DISPLAY SYSTEM

FIELD OF THE INVENTION

This invention relates to an information display system, and relates more particularly but not exclusively to an information display system to be used for collecting and displaying visual information.

DESCRIPTION OF THE PRIOR ART

Known forms of information kiosk are bulky and are normally aligned at a fixed angle for viewing. This limits the potential usefulness of the kiosk and restricts the degree of ergonomic friendliness for human use. The video cameras fitted to existing information kiosks are normally fixed in their field of view, thereby limiting the amount of visual information.

An object of the present invention is to provide an apparatus comprising a stand and tilting display head, designed to allow a variable angle for use, which is more suited to human ergonomics and enables the display head with its in-built camera to be tilted in the most suitable position for the user to view. The apparatus could be used for example in situations such as video conferencing, a shop window display or as a source of information to a person standing beside the unit.

BRIEF SUMMARY OF THE INVENTION

According to the present invention there is provided an information display system comprising a base unit on which there is mounted a display head, the display head carrying a display monitor, the display head being pivotally mounted on the base unit so as to allow the monitor to be selectively directed towards a user.

The pivotal mounting of the display head is preferably such as to permit pivoting of the display head about an axis that is substantially horizontal.

Preferably, automatic pivoting means are incorporated within the system to allow for automatic pivoting of the display head.

Preferably, said automatic pivoting means comprises sensing means for sensing the position of a user and control means for generating a position-dependent control signal to operate motor means to effect pivoting of the display head towards the user.

BRIEF DESCRIPTION OF THE DRAWINGS

Embodiments of the present invention will now be described by way of example, with reference to the accompanying drawings wherein.

DETAILED DESCRIPTION

Figure 1:
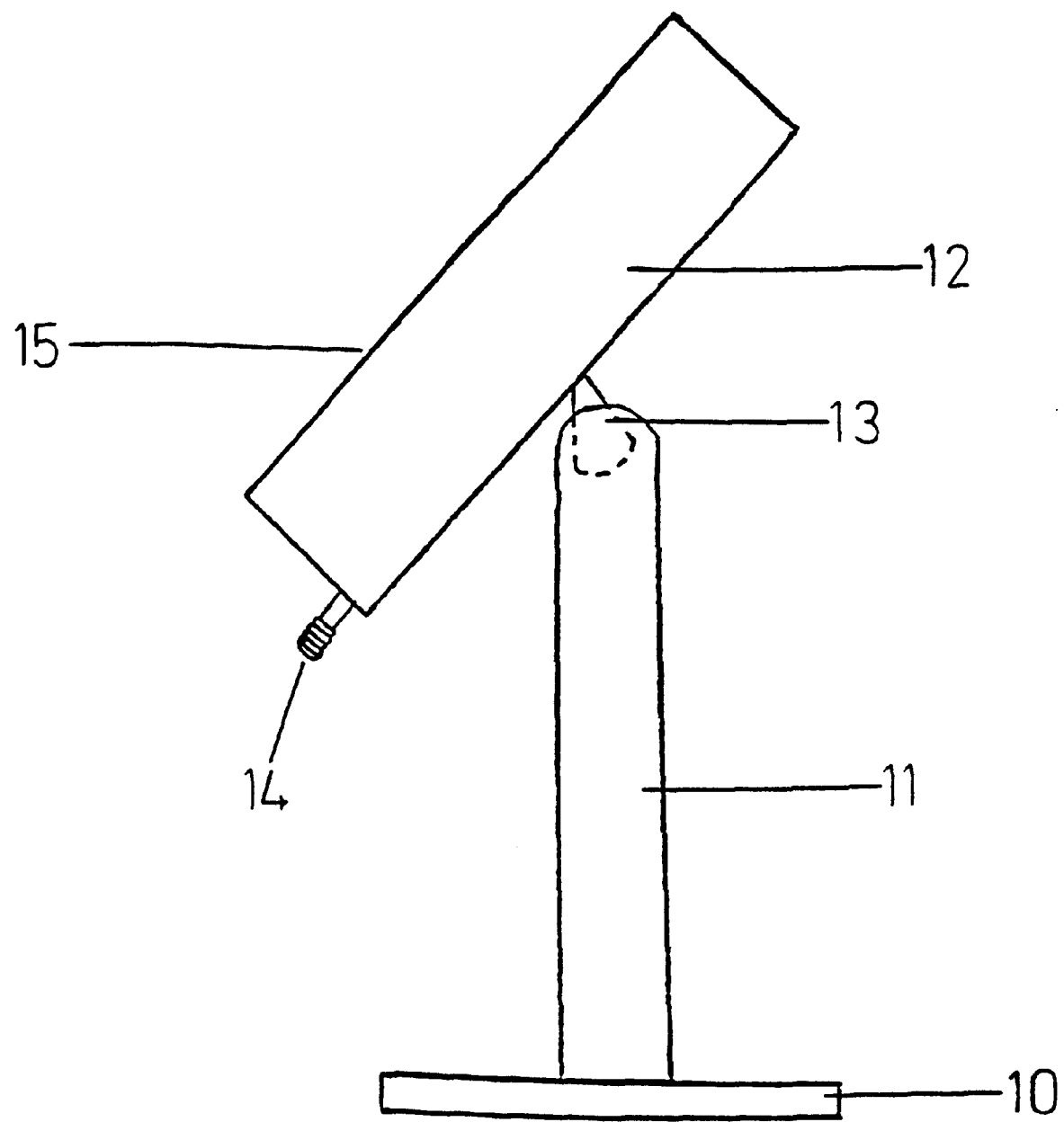
FIG. 1 is a schematic side elevational view of a first embodiment of an information display system.

Referring to the drawings, FIG. 1 illustrates a first embodiment of an information display system, comprising a base 10, a post 11, a manually tiltable display head 12, a friction locking clamp 13, a handle 14 for tilting the display head 12 and a display monitor 15.

When a user approaches the display system, it will be probable that the display head 12 is not in an ergonomically suitable alignment for the user. Therefore, adjustment of the tilt angle will be required. This is achieved by means of loosening the clamp 13 and using the handle 14 to adjust the tilt angle of the display head 12 about a substantially horizontal axis until it is in a suitable position, the friction locking clamp 13 then being re-tightened to hold the display head 12 at the selected tilt angle.

Figure 2:
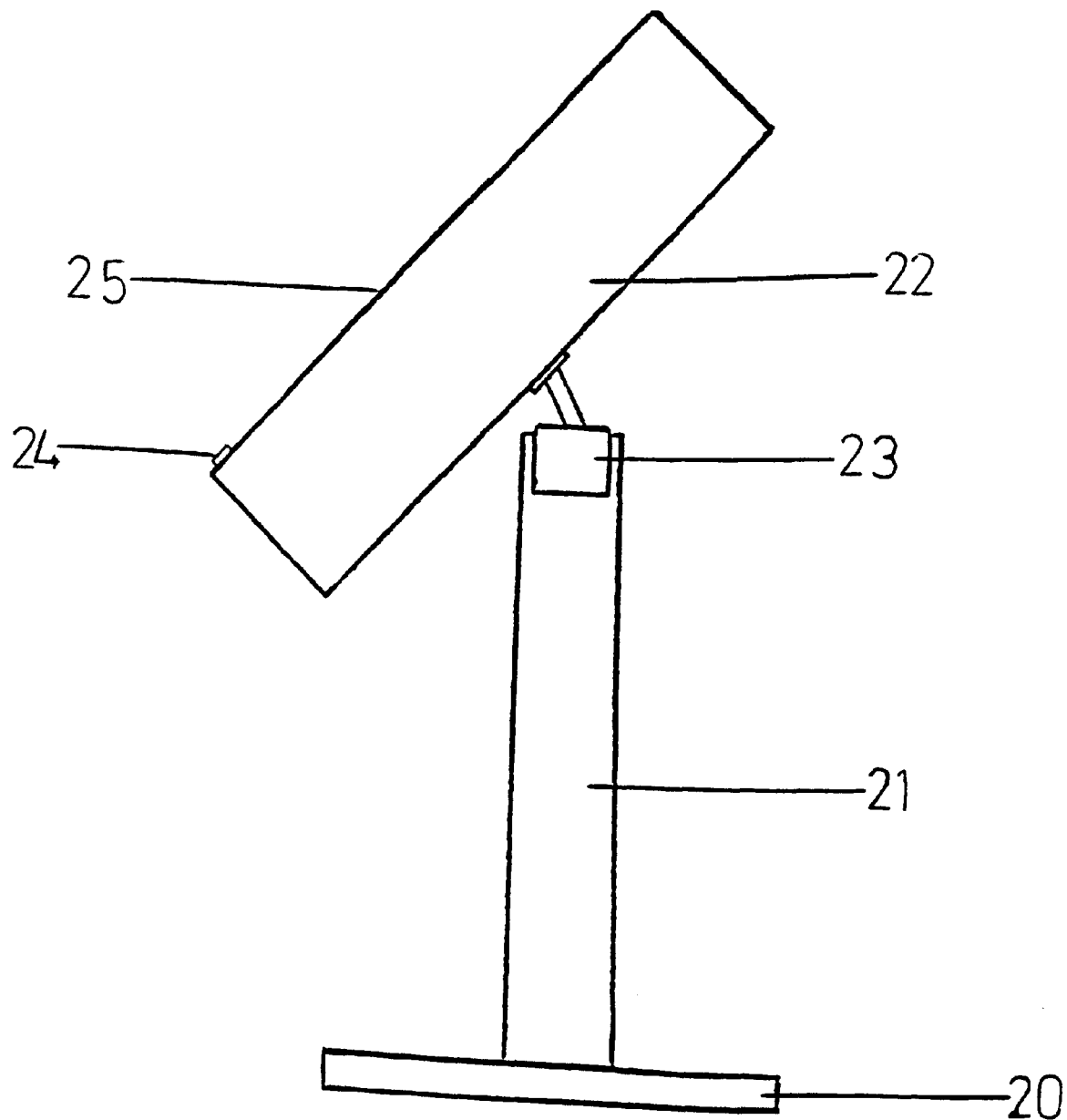
FIG. 2 is a schematic side elevational view of a second embodiment of the information display system.

FIG. 2 illustrates a second embodiment of the present invention comprising a stand 20, a post 21, a display monitor 25, a tilting display head 22, a tilt motor 23 and a tilt control switch 24.

In the second embodiment a user can adjust the tilt angle of the display head 22 by means of a tilt control switch 24. When depressed, the tilt control switch 24 activates the tilt motor 23. The tilt motor 23 tilts the display head 22 about a substantially horizontal axis to a suitable angle for the user to view.

Figure 3:
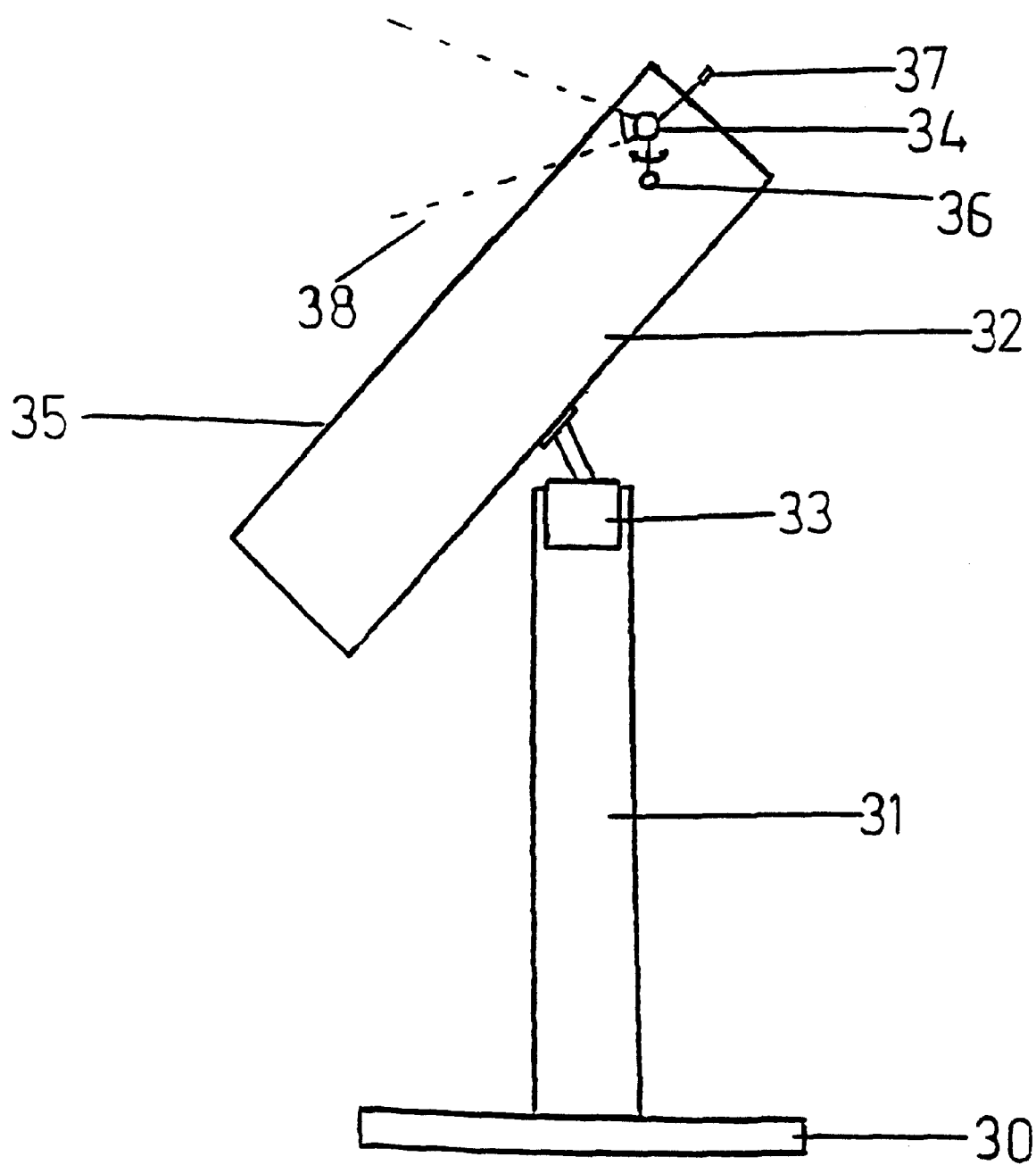
FIG. 3 is a schematic side elevational view of a third embodiment of the information display system.

Referring now to FIG. 3, this illustrates a third embodiment of the display system in the form of a base 30, a post 32 supporting a tilting display head 32, and a tilt motor 33. Incorporated within the tilting display head 32 is a user-detecting camera 34 and a display monitor 35, together with the necessary wiring and connections. The camera 34 and its associated mechanisms are shown separately in FIG. 4.

In operation of the third embodiment, a user approaches the kiosk and the display head 32 will automatically adjust to the height of the user's eyes, so that the display monitor 35 is in clear view for the user to see and operate. Such adjustment is achieved by means of the camera 34 tracking the user, by detecting the user's head shape and/or eye blinking. This activates the tilt motor 33 which adjusts the display head 32 by pivoting about a substantially horizontal axis until the camera 34 has focused on the user's eyes.

The means for adjusting the camera 34 can be automatic or manual.

Figure 4:
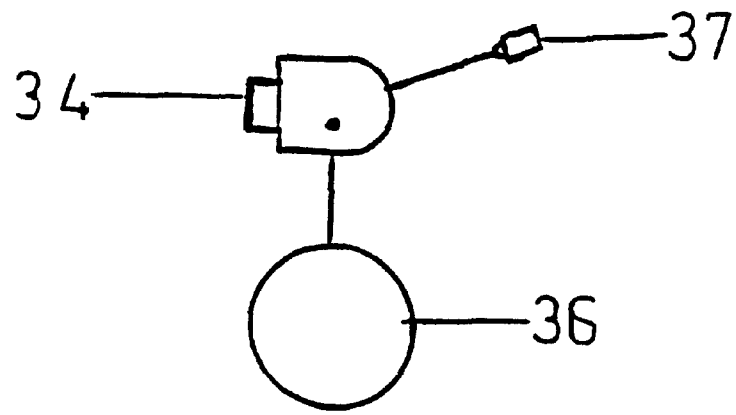
FIG. 4 is a schematic side elevational view of the camera and its associated mechanism as used in the third embodiment.

As shown in FIG. 4, automatic adjustment of the camera 34 is achieved by means of a pendulum weight 36 attached to the base of the camera 34 which is independently pivoted about a separate horizontal axis. As the camera 34 tracks the user, the display head 32 will pivot accordingly thus altering the viewing angle. The camera 34 however remains at a constant viewing angle 38 due to the pendulum weight 36 counterbalancing the independently pivoted camera 34.

Alternatively, manual adjustment of the camera 34 can be achieved by means of a handle 37 which allows the gravitational adjustment of the pendulum 36 to be overridden. Incorporated within the handle 37 is an operate/stand-by switch.

The viewing angle 38 of the camera 34 regulates the activity of the tilt motor 33.

The display head 32 can protect itself from use and abuse from children, as the display head 32 will become inactive if the camera 34 indicates from the tilt angle measurement that the user's height is below a pre-set minimum height.

Figure 6:
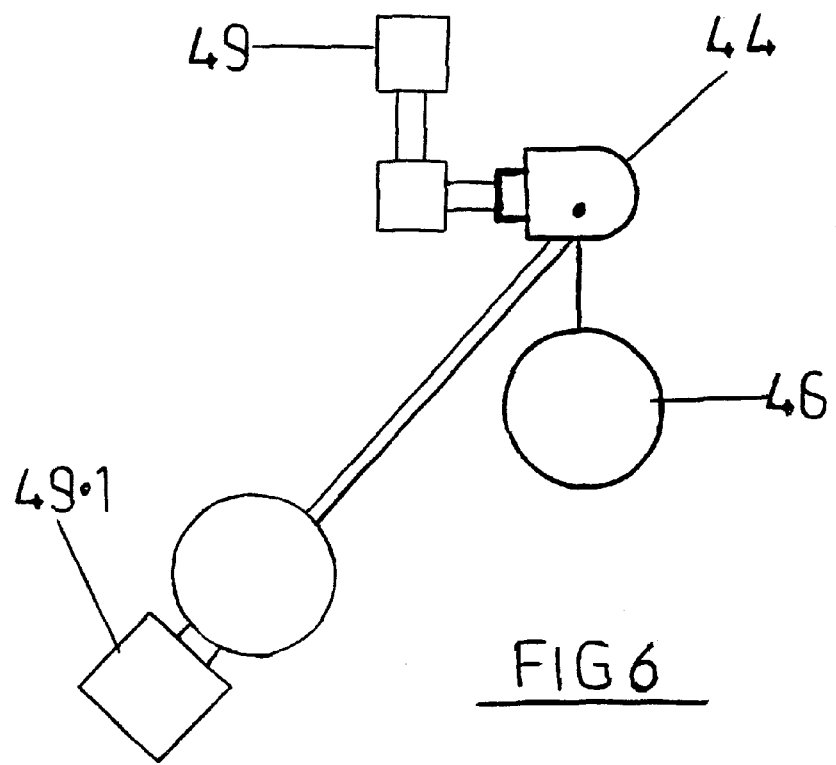
FIG. 6 is a schematic side elevational view of the camera and its associated mechanisms, as used in the fourth embodiment.
Figure 5:
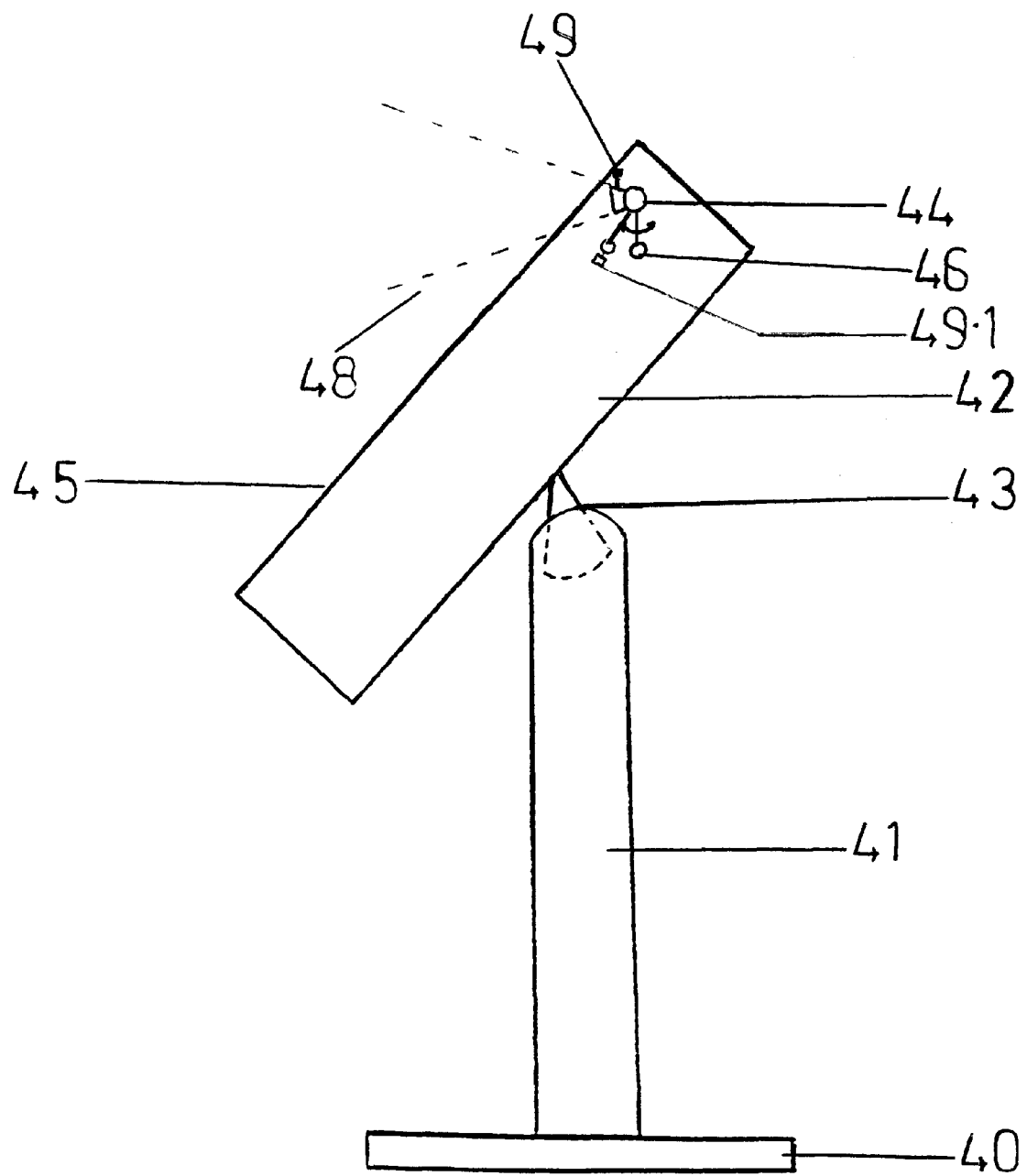
FIG. 5 is a schematic side elevational view of a fourth embodiment of the information display system.

Referring now to FIGS. 5 and 6, these illustrate a fourth embodiment of the display system comprising a base 40, a post 41, a display head 42, a friction locking clamp 43, a camera 44, a display monitor 45, a pendulum weight 46, a zoom servo 49 and a camera angle positioning servo 491.

In the fourth embodiment, the display head 42 is adjusted by pivoting about a substantially horizontal axis to a suitable position and then locked in that position by means of the friction locking clamp 43. When in use, the camera 44 will be adjusted automatically by means of a camera angle positioning servo 491 which can override the pendulum weight 46.

By this method the camera 44 would be adjusted to optimise for the best viewing of a person using the display stand for video conferencing (for example), preferably by concentrating on the person's head and shoulders. The apparatus will incorporate a person presence detection system so as to give the kiosk audio/visual response when it is being viewed.

Suitable software could be incorporated whereby the display system may also recognise the positions of a number of people, their sound and their movements, who may for example be video conferencing, and by recognising mouth movements for example, or microphone input positioned in front of each person, the camera 44 will then be able automatically to zoom in on a person currently talking.

The display system will provide automatic adjustment of sound level referenced to background noise.

The self-adjusting display head 42 optimises best contrast and anti-glare.

The system may also incorporate means to provide a content variation according to the time of day, e.g. window operation after hours.

The means for tracking the user and enabling the camera 44 to focus on the user's eyes, providing a content variation, adjusting the display to optimise contrast and anti-glare and providing automatic adjustment to sound level to background noise, may be software/process controlled, and incorporated within the internal control means of the display system.

Means may also be incorporated enabling the display monitor 45 to move axially relative to the display head 42.

Where appropriate, the above-described exemplary embodiments can be modified such that the display head pivots about a suitable axis which is other than horizontal.

Other modifications and variations of the above-described exemplary embodiments can be adopted without departing from the scope of the invention as defined in the appended claims.

What is claimed is:

1. An information display system comprising:

a base unit;

display head mounted on the base unit;

a display monitor carried by said display head;

means for pivotally mounting the display head on base unit so as to allow the display monitor to be selectively directed towards a user;

automatic pivoting means to allow for automatic pivoting of the display head;

said automatic pivoting means including motor means to effect pivoting of the display head towards the user, sensing means for sensing the position of a user, and control means for generating a position-dependent control signal to operate said motor means to effect pivoting of the display head towards the user;

wherein the control means renders the display head inactive if the user's height is sensed as being below a pre-set minimum height.

2. An information display system as claimed in claim 1 wherein said means for pivotally mounting of the display head is such as to permit pivoting of the display head about an axis that is substantially horizontal.

\* \* \* \* \*